United States Patent [19]

Lawrence

[11] Patent Number: 5,564,554
[45] Date of Patent: Oct. 15, 1996

[54] RECIPROCATING ACCUMULATION CONVEYOR

[75] Inventor: Eric C. Lawrence, South El Monte, Calif.

[73] Assignee: Lawrence Equipment, Inc., El Monte, Calif.

[21] Appl. No.: 333,001

[22] Filed: Nov. 1, 1994

[51] Int. Cl.[6] .................................................. B65G 47/26
[52] U.S. Cl. ........................................ 198/432; 198/418.6
[58] Field of Search ................................... 198/431, 432, 198/418.6, 848

[56] References Cited

U.S. PATENT DOCUMENTS

| | | | |
|---|---|---|---|
| 1,217,345 | 2/1917 | Rasmussen | 198/418.6 |
| 1,787,254 | 12/1930 | Kirman et al. | 198/431 |
| 3,754,126 | 9/1973 | Burgess | 198/431 |
| 4,318,469 | 3/1982 | Kassner | 198/848 |
| 4,431,104 | 2/1984 | Orlowski et al. | 198/427 |
| 4,690,269 | 9/1987 | Takao | 198/431 |
| 4,940,130 | 7/1990 | Aquino et al. | 198/432 |

FOREIGN PATENT DOCUMENTS

| | | | |
|---|---|---|---|
| 212023 | 3/1987 | European Pat. Off. | 198/431 |
| 672634 | 11/1965 | Germany | 198/431 |
| 347046 | 9/1972 | Germany | 198/431 |
| 327388 | 5/1969 | U.S.S.R. | |

*Primary Examiner*—William E. Terrell
*Assistant Examiner*—Tamara Kelly
*Attorney, Agent, or Firm*—Lyon & Lyon

[57] ABSTRACT

A reciprocating accumulation conveyor temporarily accumulates pressed tortillas delivered periodically from a press and delivers them onto an oven belt in a substantially continuous supply, thereby providing more uniform baking. The reciprocating accumulation conveyor has an accumulation belt which accelerates to match the speed of the press belt in the press, when the press belt moves periodically between pressing cycles, to accumulate the pressed batch of tortillas. The accumulation belt simultaneously extends partially over the prior batch moving onto the oven belt, and drops down behind the lasts row of the prior batch on the oven belt. The accumulation conveyor belt then advances at a delivery speed to transfer the tortillas onto the oven belt.

6 Claims, 6 Drawing Sheets

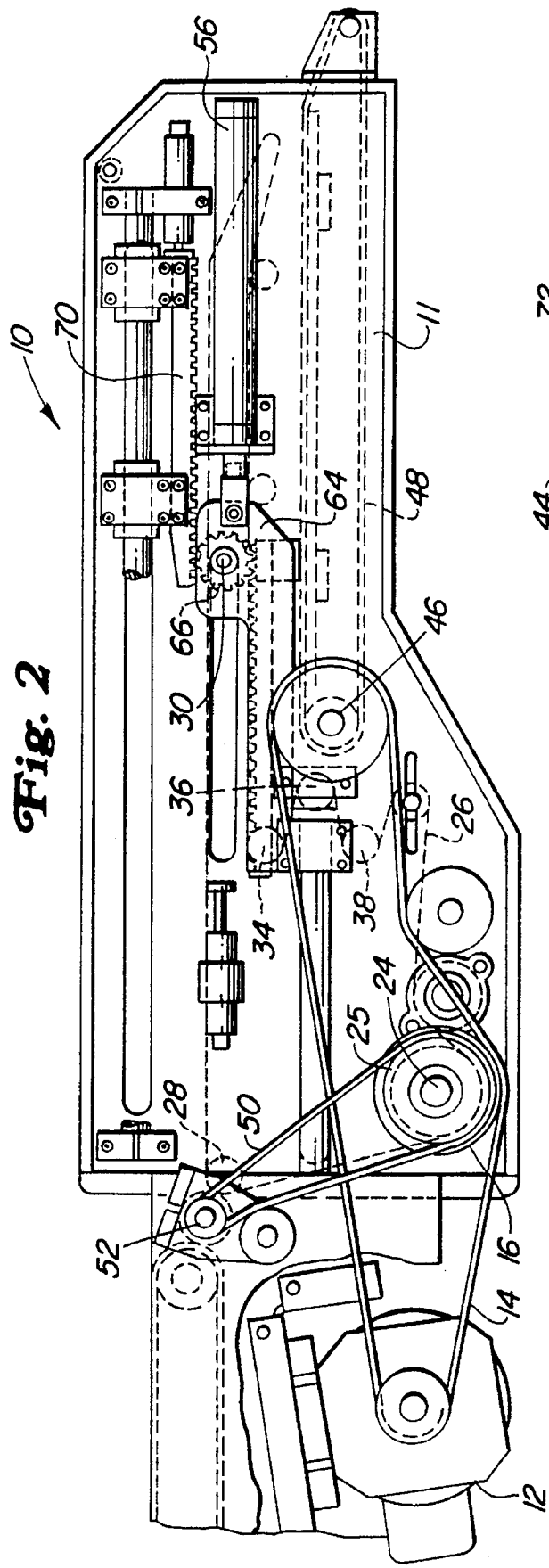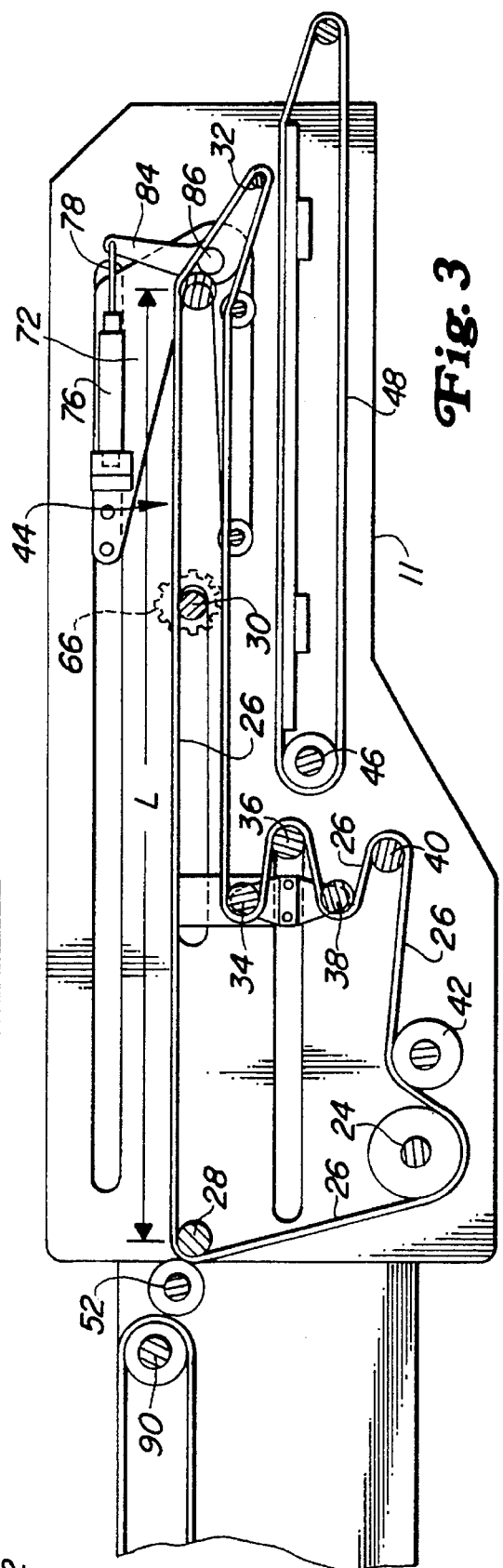

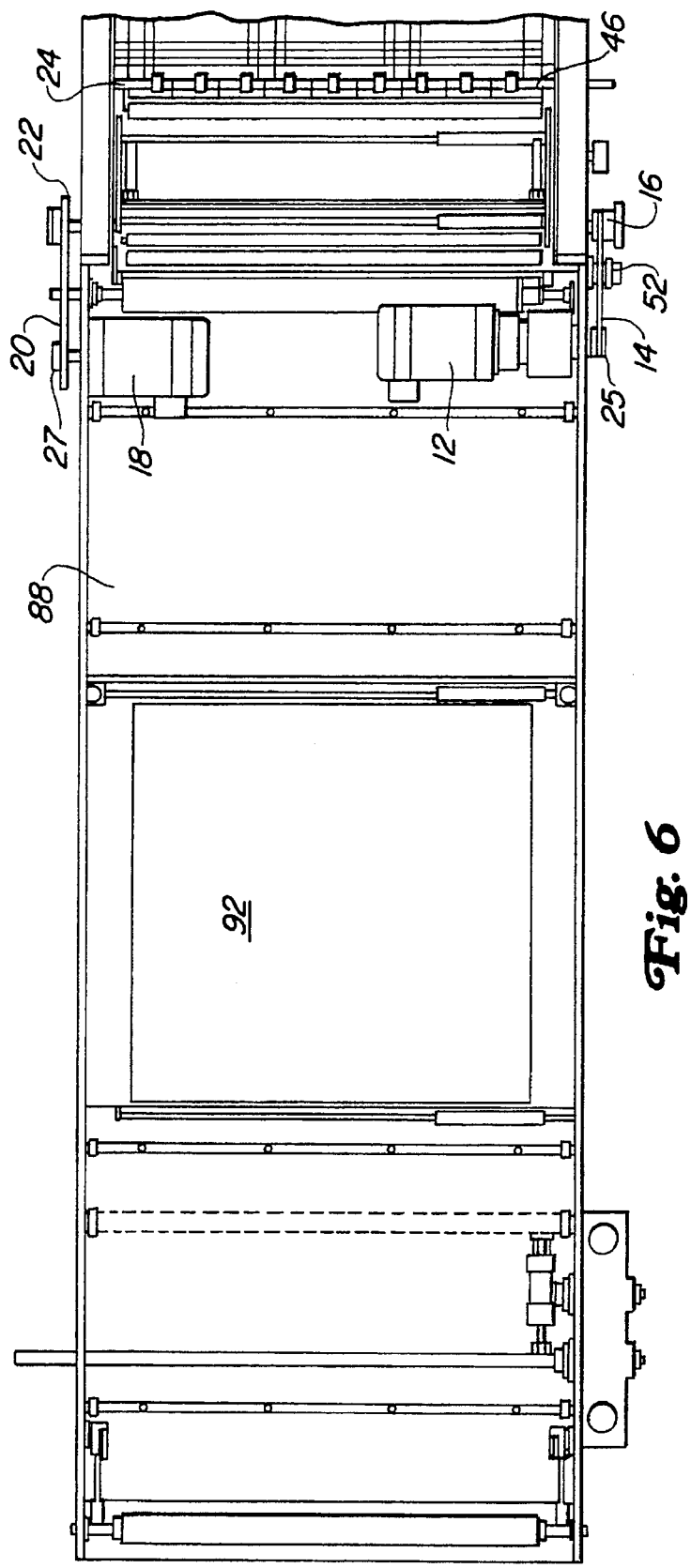
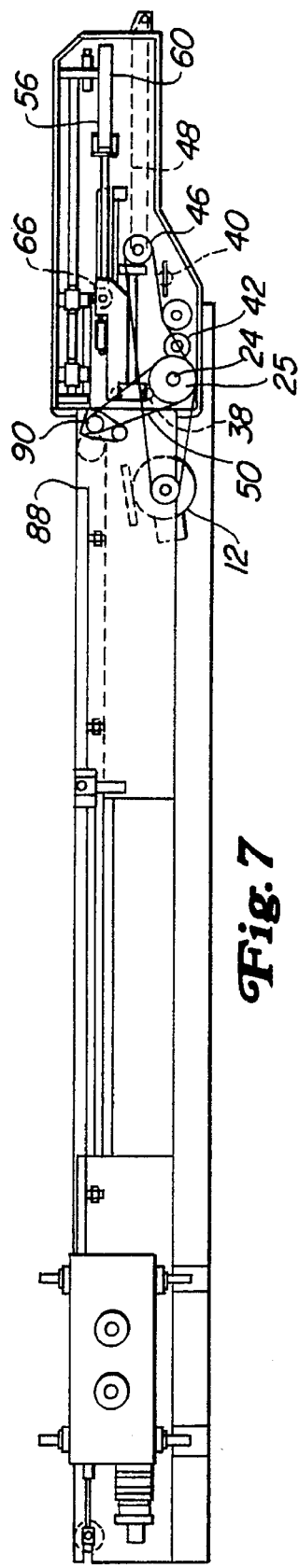
Fig. 6
Fig. 7

RECIPROCATING ACCUMULATION CONVEYOR

BACKGROUND OF THE INVENTION

The present invention relates to an industrial conveyor. More particularly, the present invention relates to a conveyor that serves as a continuous link to transfer objects between an intermittent or batch conveyor and a constant speed conveyor.

Conveyors are utilized in industry for a variety of purposes, including moving objects during manufacturing, typically between various work stations, for different steps in manufacturing processes. The time required to work on the product at each work station typically varies. The most time-consuming step limits the speed of the manufacturing process as a whole, as the flow of products must be slowed or periodically completely stopped to accommodate the longest step. This slowing or stopping can adversely affect the quantity and quality of the products made by certain manufacturing processes.

The food product manufacturing industry is an example where these disadvantages may arise. The pressing of food products, such as tortillas, typically requires complete stoppage of the press conveyor belt while the press is applied to flatten a batch of dough balls on the belt. This stopping and starting results in tortillas being delivered in batches to the next station, i.e., the oven, rather than in a steady flow. The resulting distribution of tortillas on the oven belt is therefore a repeating pattern of spaced apart batches of tortillas. Due to the batch distribution, the oven temperature may disadvantageously vary. "Hot spots" and "cold spots" may develop in the oven. This results in non-uniform baking, i.e., some tortillas are baked more completely than others. This overbaking is worsened when the desired product requires a longer duration of pressing time.

Specifically the section of the oven conveyor that is occupied by a batch of tortillas cools the batch advances through the oven chamber, while the sections of the oven belt vacant of product become overheated. Thus tortillas on subsequent cycles may or may not bake evenly dependent upon whether they are advanced onto a section of the oven belt that in its last revolution, was or was not vacant.

Conventional press/oven systems also can cause difficulties because they do not constantly regulate the quantity flow of product to the infeed sections of the automatic packaging systems.

To maximize production rates, the conveyor segments of the press/oven machines are operated at high surface speeds. At the transfer point from press to oven the lapsed space between batches occurs. As a result, downstream in the process, presently available detection devices, used for counting and packaging, and operating at their threshold of accuracy, frequently miscount the product.

When the distance between the batches of tortillas on the press oven systems are more constant, the performance of these detection devices and packaging devices is improved.

Accordingly, it is an object of the invention to provide a conveyor which accumulates a product delivered periodically from a first station and delivers the product substantially uniformly to a second station.

SUMMARY OF THE INVENTION

These and other objects of the invention are accomplished by a reciprocating accumulation conveyor serving as a buffer between an interval or periodically operated conveyor and a constant speed conveyor. Preferably, a batch of objects are loaded from a periodic belt, onto an accumulation belt, which advances at the same speed as the periodic belt during loading and simultaneously extends to accommodate the batch of products and to overtake several rows of products previously loaded onto a downstream constant speed belt. The leading edge of the fully-extended accumulation belt most desirably rotates downwardly to decrease the distance that the products on the accumulation belt must drop through as they are loaded onto the constant speed belt. The accumulation belt preferably advances at the same speed as the constant speed belt and retracts, thereby relatively gently downloading the products onto the constant speed belt while advantageously maintaining their shape and a nearly constant spacing between each row of the products on the constant speed belt. The leading edge of the fully-retracted accumulation belt preferably rotates upward to prepare to receive the next batch of products.

BRIEF DESCRIPTION OF THE DRAWINGS

In the drawings, wherein similar reference characters denote similar elements throughout the several views:

FIGS. 2 is a right side elevational view of the accumulation conveyor of FIG. 1;

FIG. 3 is a partial section view thereof showing the belt arrangements;

FIG. 6 is a plan view of the present accumulation conveyor in a preferred embodiment, in use between a press and an oven;

FIG. 7 is a side elevation view thereof; and

DETAILED DESCRIPTION OF THE PREFERRED EMBODIMENT

Figure 1:
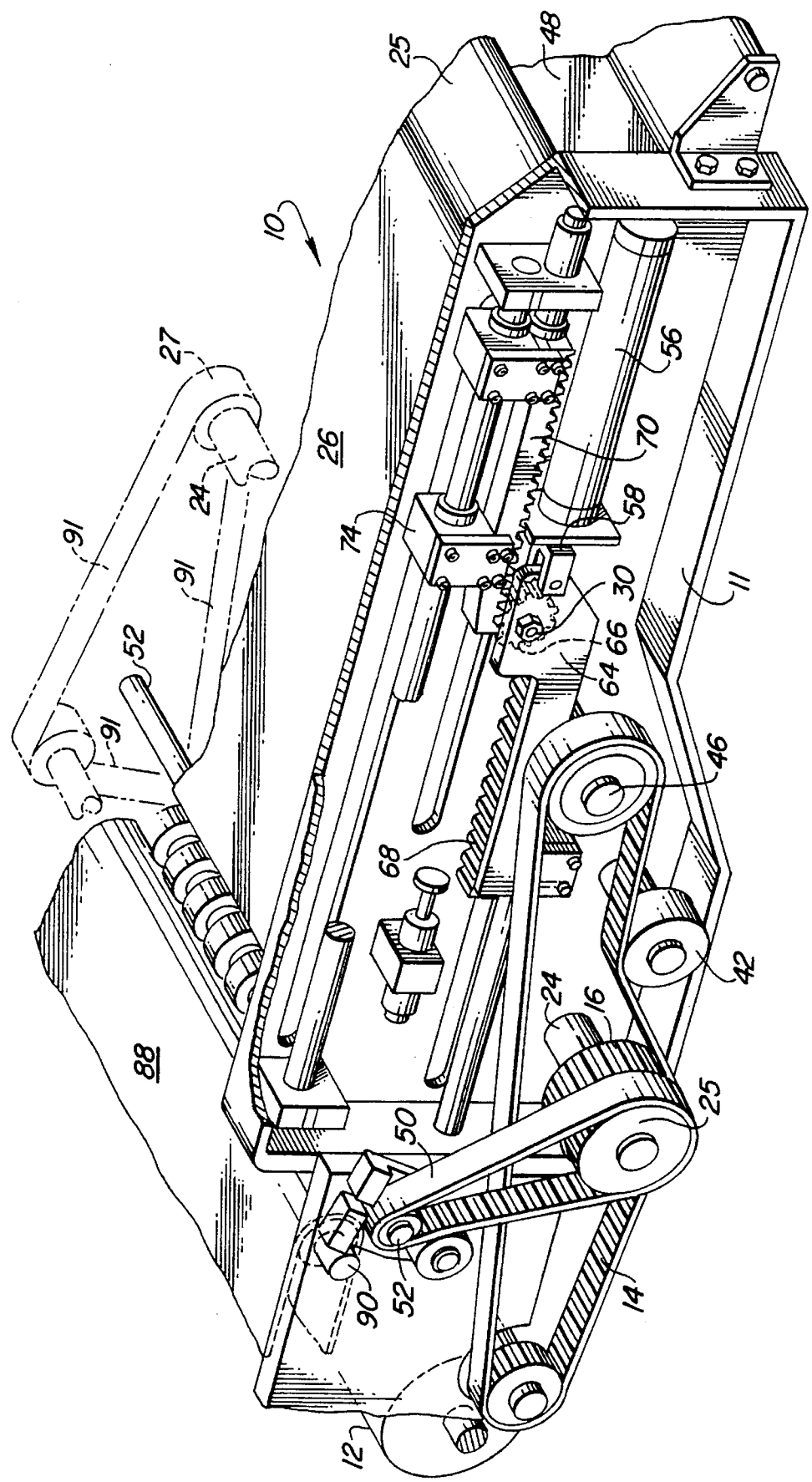
FIG. 1 is an isometric view of the right side of the present accumulation conveyor, in an extended position, with portions cut away for clarity of illustration.

As shown in FIG. 1, the present reciprocating accumulation conveyor 10 has a frame 11 and a first motor 12 for driving a first drive belt 14. The first drive belt 14 extends around and drives a first pulley 16. As shown in FIG. 6, the conveyor 10 also has a second motor 18 for driving a second drive belt 20. The second drive belt 20 extends around and drives a second pulley 22.

Referring to FIGS. 2–3, an accumulation belt 26 extends around a shaft 24, a first fixed roller 28, a support roller 30, a nose bar roller shaft 32, a first mobile roller 34, a second fixed roller 36, a second mobile roller 38, an adjustable tensioning roller 40, and a guiding pulley 42, which together with the shaft 24 define the path of the accumulation belt 26. The fixed rollers 24, 36, and 28 are rotatably attached to, and cannot translate relative to the frame 11. The mobile rollers 34 and 38 are rotatably attached to alternating armatures 64. The first fixed roller 28 and the nose bar 32 define the length dimension L of the accumulation belt landing area. The first motor 12 drives the shaft 24 through a drive clutch 25 which causes the accumulation belt 26 to run continuously around the rolling elements described above.

The first drive belt 14 also drives a drive shaft 46. A transfer belt 48 is supported around the drive shaft 46. The continuous rotation of the drive shaft 46, which is driven by the first motor 12, causes the transfer belt 48 to run continuously at a generally constant speed, to convey tortillas from the accumulation belt 26, to the next station, which may be an oven. The transfer belt 48 may optionally extend into and through the next station or oven. A transmission belt 50 passes over the first pulley 16 and a terminal press roller 52. The terminal press roller 52 rotates as the first pulley 16 is driven.

Figure 4:
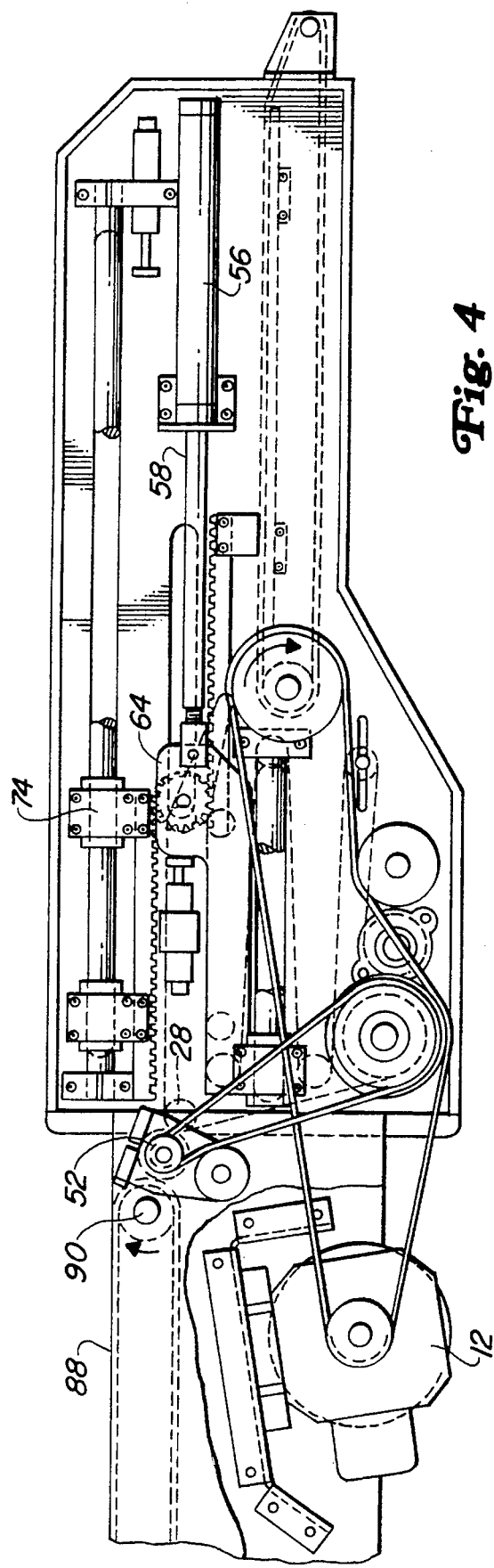
FIG. 4 is a right side elevation view showing the conveyor in a retracted position.

Referring to FIG. 4, air cylinders 56 attached to the frame 11 push and pull on rods 58. A compressed air source (not shown) supplies compressed air to the cylinders 56. Air cylinder valves control the supply of compressed air, to drive the rods 58 in and out of the cylinders 56.

The rods 58 are attached through a clevis to the alternating armatures 64.

Figure 5:
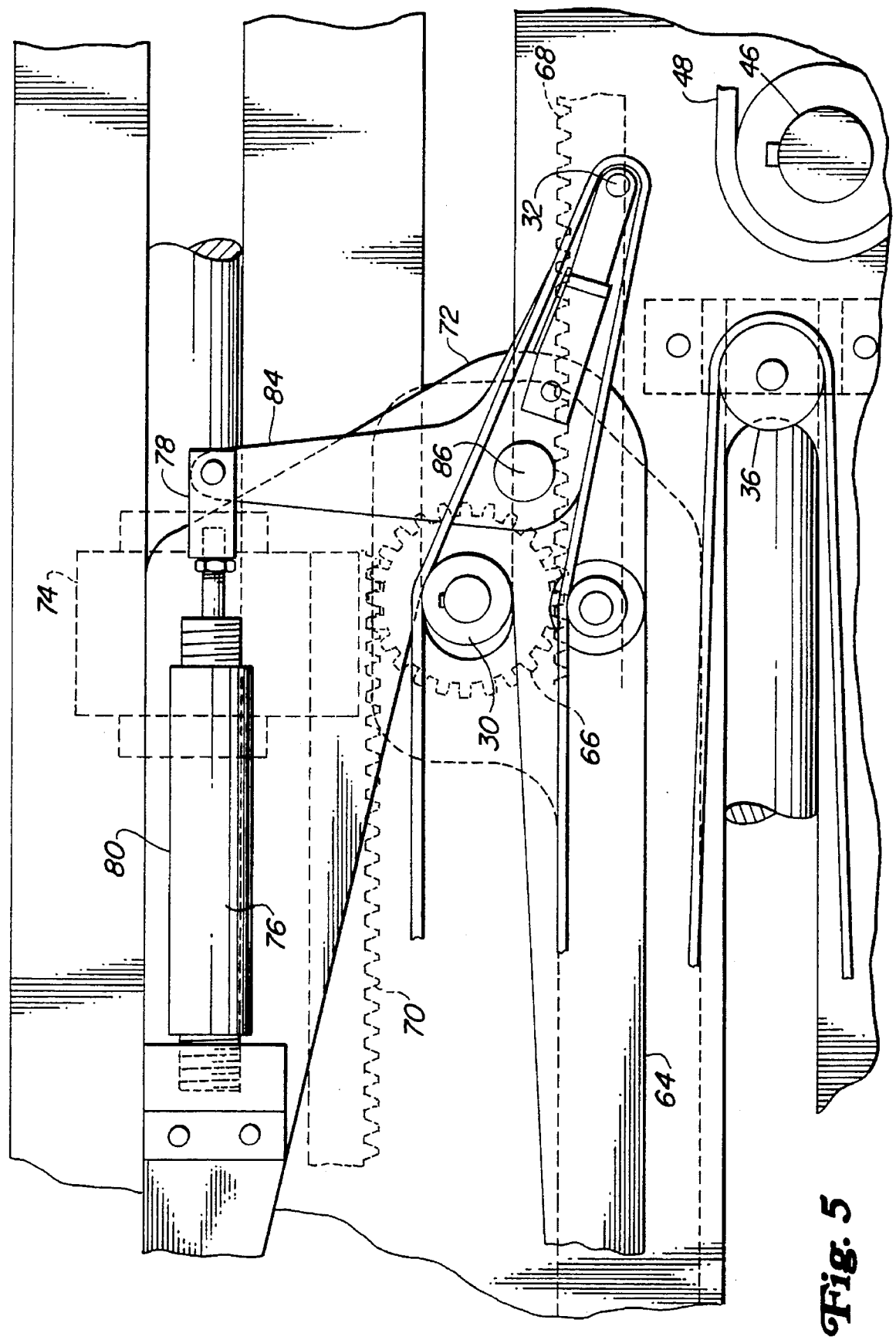
FIG. 5 is an enlarged elevation view fragment of the nose bar of the conveyor of FIG. 1.
Figure 8:
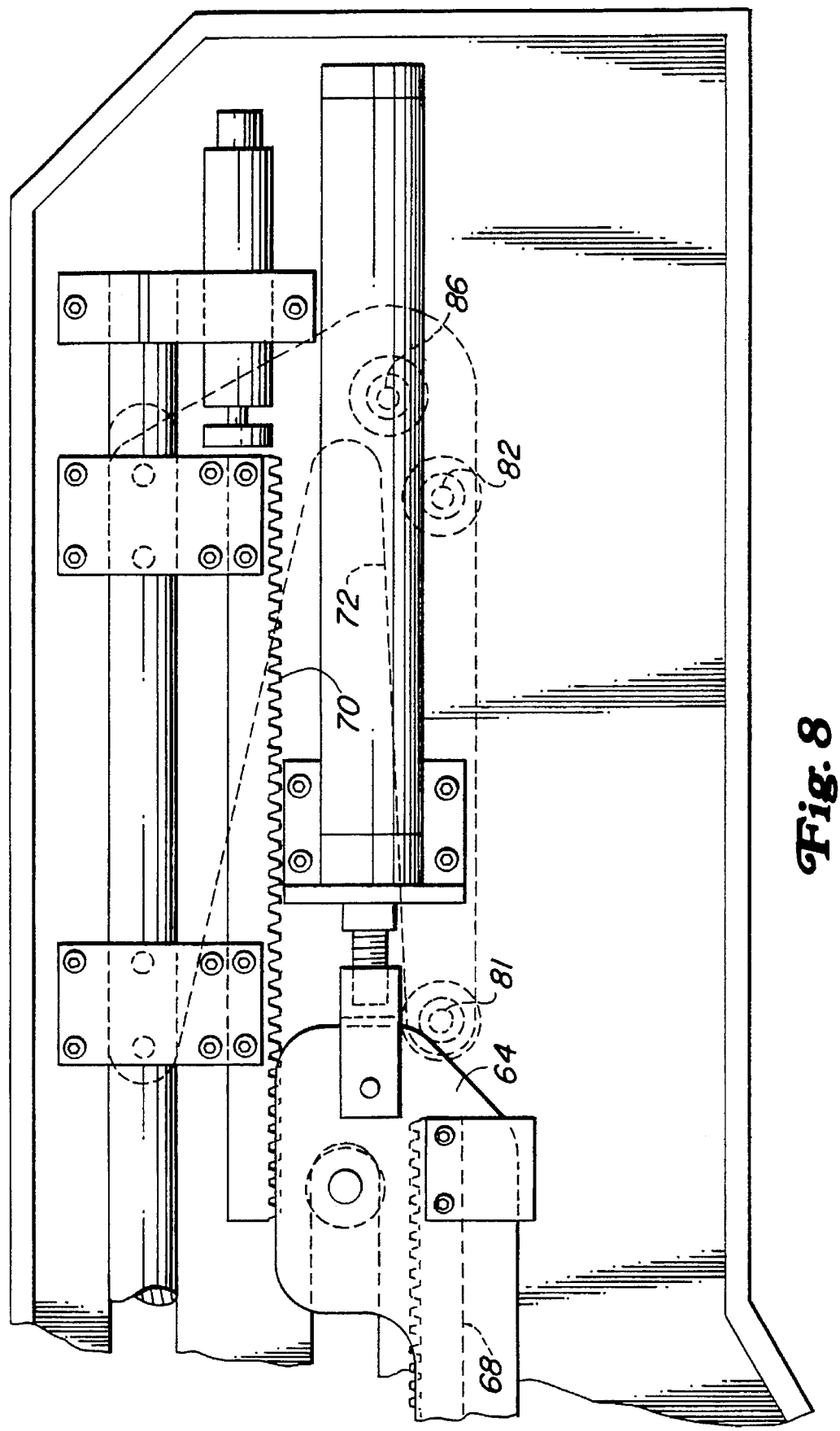
FIG. 8 is a side elevation. view in part section showing the V-frame of the conveyor of FIG. 1.

As shown in FIG. 5, dual pinion gears 66 are attached to the opposite ends of the support roller 30 and mesh with dual fixed racks 68 and dual mobile racks 70. Thus, the movement of the support roller 30, which is rotatably attached to the armatures 64 causes the pinions 66 to rotate. This in turn moves the mobile racks 70. The travel distance of the mobile racks 70 is twice that of the pinions 66 and the axially-aligned support roller 30. The symmetrical arrangement of the pinions 66 on the fixed racks 68 on either side of the conveyor prevents potential minor pressure differences between the air cylinders from forcing the armatures 64 out of alignment.

Referring to FIGS. 1, 4 and 5, the mobile racks 70 are attached to dual V-frames 72 by bearing blocks 74. The nose bar 32, is rotatably supported on L-brackets 84 attached to the V-frames 72 and moves in lock-step with the mobile racks 70, covering twice the distance of the pinions 66 and the support roller 30. Since the nose bar 32 defines the leading edge of the path of the accumulation belt 26, the length dimension of the accumulation belt landing area 44 varies with the travel distance of the V-frames 72.

Compressed air is also supplied via flexible loop hoses extending from the frame 11 to dual nose bar air cylinders 76, attached to the V-frames 72. Rods 78 are driven in and out of dual nose bar air cylinders 80 as air pressure is applied in timed sequence by opening and closing dual nose bar air cylinder valves. The movement of the nose bar rods 78 provides torque to L-brackets 84, which pivots the nose bar 32 about a hinge 86. Since the nose bar 32 defines the path of the leading edge of the accumulation belt 26 the rotation of the nose bar 32 also changes the trajectory of the leading edge of the accumulation belt 26. Idler shafts 80 and 81 extending across between the V-frames 72 support the belt 26 on its return from the nose bar.

Referring to FIGS. 1, 6 and 7, in operation, the present reciprocating accumulation conveyor 10 is preferably positioned between a press 92 and an oven (not shown), and serves as a buffer to allow a generally steady flow of product into the oven, despite 25 the periodic movement of the press conveyor belt 88. The conveyor 10 accumulates a batch of pressed tortillas from the press belt 88 which moves only periodically (e.g. every 3 seconds) but at a first higher speed, and then delivers it onto the transfer belt 48 at a second slower speed, so that the transfer belt is substantially continuously supplied. This function is achieved reciprocation, i.e., advancing and retracting of the accumulation belt 26 over the transfer belt 48, with coordinated raising and lowering of the nose bar 32, and by accelerating the speed of the accumulation belt to match the speed of the press belt 88 when the press belt 88 advances.

In the first or extension stage, two events occur in timed sequence: (1) an increase in the speed at which the accumulation belt 26 advances about its path; and (2) an increase in the length dimension of the accumulation belt landing are 144.

Referring to FIG. 4, the press belt 88, which moves tortillas in batches periodically through the press 92 with each pressing cycle, is linked via the press belt roller 90 and a connecting belt 91 to an acceleration clutch 27 on the shaft 24, which in turn is linked to the first fixed roller 28. A press belt end roller 90 at the end of the press belt loop is positioned adjacent to the first fixed roller 28, to facilitate transfer of the pressed food product from the press belt 88 to the accumulation belt 26. The terminal press roller 52 is surrounded by foam rollers 96 which better engage the leading edge of the pressed food product to remove it from the press belt 88 and transfer it onto the accumulation belt 26. The foam rollers 96 also help to prevent deformation of the advancing product, e.g., tortillas which might otherwise result from their adhesion to the terminal press roller 52 during their transition from the press belt 88 to the accumulation belt.

The acceleration clutch 27 causes the accumulation belt 26 to move at the same speed as the press belt 88, when the press belt 88 advances (i.e., the accumulation belt accelerates to an "accumulation" speed). When the press belt 88 is stopped, during pressing, the accumulation belt 26 moves at a "delivery" speed, as driven only by the motor 12 via the drive clutch 25, which is slower than the accumulation speed. As the press belt and the accumulation belt are matched in speed, when the press belt moves, the pressed product can be smoothly transferred.

At the same time, the armature air cylinder valves open, to drive or retract the armature rods 58 and pull the armatures forward (toward the oven). The first mobile roller 34, the second mobile roller 38 and the support roller 30 advance in lock-step with the armatures 64.

The rotation of the pinions 66 caused by the motion of the support roller 30 sets the mobile racks 70 in motion. The nose bar 32 advances in lock-step with the mobile racks 70. Since the nose bar 32 defines the path of the accumulation belt 26, the length dimension of the accumulation belt landing area 44 increases by the same amount that the second armatures 72 advance. The support roller 30, advancing with the first armatures 64 so as to travel one-half the distance of the nose bar 32, helps to prevent excessive sagging of the accumulation belt 26 caused by gravity as the length dimension of the accumulation belt landing area 44 increases. The racks 70 and pinions 66 interact to cause support roller 30 to remain substantially centered under the unsupported accumulation belt span.

Referring to FIGS. 2 and 3, the additional "length" needed for the accumulation belt 26 during the extension stage is provided by the advancement of the first mobile roller 34 and second mobile roller 38 attached to the first armatures 64. As these rollers advance, the loops of the accumulation belt 26 over them shorten to allow the accumulation belt landing area 44 to lengthen. Each inch of travel of the mobile rollers allows the nose bar 32 to advance two inches. Total advancement is advantageously matched to the size of the press, so that the fully extended accumulation belt can fit an entire batch, for example, 4 rows of product. The adjustable tensioning roller 40 can be adjusted to optimize the static tension in the accumulation belt 26. Routing the accumulation belt over the rollers 34, 36, 38 and 40 allows the belt a sufficient extension length, without requiring the conveyor 10 to be unduly long.

Referring to FIG. 3, the accumulation belt top length reaches a maximum or is fully extended when the armature rods 58 are fully retracted into the air cylinders. At that point, the leading edge of the accumulation belt 26 supported around the nose bar 32, is disposed above and substantially forward or overlapping the transfer belt 48. The fully-extended accumulation belt 26 accommodates the batch of product that emerge from the press 92 as the product is downloaded from the press belt 88 over the terminal press roller 52 throughout the extension stage.

The increase in speed of the accumulation belt 26 takes advantage of the full extension of the accumulation belt 26 by allowing the batch of tortillas downloaded from the press belt 88 to overtake the tortillas previously downloaded onto and travelling slowly forward on the transfer belt 48. (The batch of tortillas loaded from the press belt 88 "lose ground" to the previously downloaded tortillas while the press belt 88 is stopped to allow the pressing function to be performed). Thus, the combination of the simultaneous extension of the accumulation belt 26 and the increase in speed of the accumulation belt 26 place the product loaded from the press belt 88 in position to be subsequently downloaded onto the transfer belt 48 with the spacing between the rows of the product approximately equal.

After the accumulation belt 26 and nose bar 32 are fully extended forward and loaded with the pressed product, the nose bar air cylinders drive the nose bar rods 78, causing the L-bracket and the nose bar 32 to pivot downwardly. Since the nose bar 32 defines the path of the leading edge of the accumulation belt 26, the leading edge of the accumulation belt 26 also moves down towards the continuous speed oven belt. The rollers supporting the belt 26 at the nose bar form a ramp 25, which is uniformly present at all times, due to the roller geometry. However, with the L-bracket pivoted forwardly, the angle of the ramp increases, bringing the nose bar closer to the oven belt, as shown in FIG. 3.

In the down position, the nose bar 32 advantageously decreases the distance that the product must descend when downloaded onto the transfer belt 48 in the retraction stage. The decrease in descent distance helps maintain the shape of each product and uniformity in the spacing between each row of product. The nose bar must be in the up position as the nose bar advances over the transfer belt, or else it will potentially collide into tortillas previously loaded onto the transfer belt and which are approaching the oven. The nose bar is rotated down only at the end of the extension stroke, at which time all of the product loaded onto the transfer belt from the previous batch have been carried far enough forward so that no. interference with the nose bar occurs.

During the retraction stage, the press belt is stopped for pressing. Thus, the acceleration clutch 27, and the press belt roller which drives it, are stopped. The accumulation belt 26 therefore returns to its normal "delivery" speed as driven by the drive clutch 25 and motor 12 (without any overtaking speed on shaft 24 from the acceleration clutch 27). The delivery speed is fast enough to deliver the entire batch of product onto the transfer belt during the pressing interval of the press, which coincides with the retraction stage. Since the accumulation belt 26 is moving forward and the nose bar (and its associated moving components) are moving backwards, the product is delivered into the transfer belt at little or no relative speed. (The transfer belt 48 may preferably move just slightly faster than the accumulation belt, to avoid possibly wrinkling the product.) With the accumulation belt moving at or slightly faster than the delivery speed, the armature air cylinder pushes the armatures 64 back along with the first mobile roller 34, second mobile roller 38 and pinions 66 connected to it. The rotation of the pinions 66 caused by the motion of the support roller 30 sets the mobile racks 70 in reverse motion. The mobile racks 70 retract twice the distance that the pinions 66 and the axially-aligned support roller 30 (as well as the armatures 64 and rollers 34 and 38) retract. The nose bar 32 retracts in lock-step with the mobile racks 70. The length L of the accumulation belt landing area decreases by twice the distance travelled by the armatures 64. The slack in the accumulation belt 26 resulting from the retraction of the nose bar 32 is taken-up by the retraction of the first mobile roller 34 and second mobile roller 38, which move away from the fixed rollers and increase the loop lengths.

In the extension stage the nose bar is positioned (1 batch length) forward of the trailing edge of the transfer belt 48, and in the actuation stage the nose bar 32 is lowered down. Thus, (in the retraction stage) the products on the accumulation belt 26 are positioned for advantageous downloading onto the transfer belt 48 as the accumulation belt 26 retracts. As the accumulation belt 26 retracts, the product is relatively gently downloaded onto the transfer belt 48 such that the distance between the leading edge of the first row of the product or tortillas in the batch being downloaded and the trailing edge of the last row of product in the batch previously downloaded is nearly equal to the distance between each row of product in the same batch, and the shape of the product is also better maintained.

In the reset stage, after the nose bar 32 is fully retracted, it is raised via the nose bar air cylinders, lifting the leading edge of the accumulation belt 26. The nose bar 32 and accumulation belt 26 thus pivot up and return to the original horizontal position. Once in horizontal position, the accumulation belt 26 and nose bar 32 are ready to accommodate another batch of product from the press belt 88, thereby completing the cycle.

While a single embodiment and application has been shown and described, it will be appreciated that numerous embodiments and modifications may be devised by those skilled in the art without departing from the spirit and scope of the present invention.

I claim:

1. A reciprocating accumulation conveyor comprising:

a frame;

an armature longitudinally displaceable on the frame;

a nose bar lever pivotally attached to the armature;

a nose bar roller rotatably attached to ther nose bar lever;

a support roller rotatably supported on the armature;

first and second mobile rollers rotatably supported on the armature and spaced between the first and second mobile rollers and the nose bar roller;

a metal mesh accumulation belt supported by the nose bar roller and the support roller and around the first and second mobile rollers and the idler roller on the frame;

an armature actuator attached to the frame and the armature for advancing and retracting the armature; and an accumulation belt driver for driving the accumulation belt.

2. The conveyor of claim 1 wherein the accumulation belt driver comprises a motor and overriding clutch.

3. The reciprocating accumulation conveyor of claim 1 further comprising a lower gear rack on the frame, an upper gear rack on the armature, and left and right pinion gears on the support roller, with the pinion gears enmeshed with the upper and lower gear racks.

4. The reciprocating accumulation conveyor of claim 3 wherein the nose bar lever is attached onto the upper gear rack.

5. The reciprocating accumulation conveyor of claim 1 further comprising a food press having a press belt, and an overriding clutch linked to the press belt and the accumulation belt driver.

6. The reciprocating accumulation conveyor of claim 1 further comprising a transfer belt for receiving a food product directly from the accumulation belt, with the transfer belt fixed in position relative to the frame.

* * * * *